United States Patent [19]
Terada et al.

[11] Patent Number: 5,848,829
[45] Date of Patent: Dec. 15, 1998

[54] REAR PROJECTION DISPLAY DEVICE

[75] Inventors: Katumi Terada, Kyotanabe; Daisuke Takemori, Suita; Hideyuki Kanayama, Uji, all of Japan

[73] Assignee: Sanyo Electric Co. Ltd., Osaka, Japan

[21] Appl. No.: 946,584

[22] Filed: Oct. 7, 1997

[30] Foreign Application Priority Data

Oct. 9, 1996 [JP] Japan ..................................... 8-268902
Dec. 10, 1996 [JP] Japan ..................................... 8-329699

[51] Int. Cl.$^6$ .................................................. G03B 21/14
[52] U.S. Cl. .............................. 353/74; 353/94; 359/451
[58] Field of Search .................................. 353/74, 76, 77, 353/78, 69, 94, 98; 359/443, 449, 451

[56] References Cited

U.S. PATENT DOCUMENTS

| | | | |
|---|---|---|---|
| 3,372,971 | 3/1968 | Quakerbush et al. ................... | 359/451 |
| 3,820,873 | 6/1974 | Redington et al. ..................... | 359/451 |
| 4,961,642 | 10/1990 | Ogino ....................................... | 353/74 |
| 5,264,941 | 11/1993 | Nakano et al. ......................... | 359/457 |
| 5,402,263 | 3/1995 | Kita ......................................... | 359/451 |
| 5,513,036 | 4/1996 | Watanabe et al. ...................... | 359/455 |
| 5,575,548 | 11/1996 | Lee .............................................. | 353/8 |
| 5,649,752 | 7/1997 | Shioya ...................................... | 353/20 |

Primary Examiner—William Dowling
Attorney, Agent, or Firm—Nikaido Marmelstein Murray & Oram, LLP

[57] ABSTRACT

The present invention is directed to a rear projection display device so adapted as to receive a projected image from a light valve for image formation on the rear surface of a screen and emit image light toward an observer positioned on the front side of the screen, wherein the screen is formed in the shape of a concavely curved surface with respect to the observer, so that the observer can feel as if he or she was present more intensely.

18 Claims, 9 Drawing Sheets

REAR PROJECTION DISPLAY DEVICE

BACKGROUND OF THE INVENTION

1. Field of the Invention

The present invention relates to a rear projection display device so adapted as to receive a projected image from a light valve for image formation on the rear surface of a screen and emit image light toward an observer positioned on the front side of the screen.

2. Description of the Prior Art

FIG. 14 is a schematic view showing the construction of a conventional rear projection display device. The rear projection display device is constituted by a light valve for image formation 101 comprising a projected image producing optical system composed of a single light valve or three light valves corresponding to R (red), G (green) and B (blue), a light source, and an image processing circuit (all of which are not shown), a diffusing screen 102, and an optical path constituting portion 103 forming a projection optical path from the projected image producing optical system to the diffusing screen 102. This type of rear projection display device has the advantage in that a large screen is easily achieved, as compared with that comprising a cathode ray tube as display means.

In the conventional rear projection display device, however, an observer cannot intensely feel as if he or she was present, although a large screen is realized.

SUMMARY OF THE INVENTION

The present invention has been made in view of the above-mentioned circumstances and has for its object to provide a rear projection display device in which an observer can feel as if he or she was present more intensely.

Another object of the present invention is to provide a rear projection display device in which the focus and the convergence of the eyes easily coincide with each other, and a three-dimensional effect is easily recognized when an observer views a three-dimensional image.

The present invention is directed to a rear projection display device so adapted as to receive a projected image from a light valve for image formation on the rear surface of a screen and emit image light toward an observer positioned on the front side of the screen, being characterized in that the screen is formed in the shape of a concavely curved surface with respect to the observer.

In such construction, the screen is formed in the shape of the concavely curved surface with respect to the observer, whereby the observer has a feeling of being surrounded by an image forming the shape of a concavely curved surface. Therefore, the observer feels as if he or she was present more intensely.

The screen may comprise a diffusion layer positioned on the side of the observer and forming the shape of the concavely curved surface, and a transparent layer positioned on the side of the light valve for image formation and forming the shape of a concavely curved surface with respect to the light valve for image formation.

When an image forming distance is set between a light emitting portion of the light valve for image formation and the center of the diffusion layer forming the shape of the concavely curved surface, the distance from the light valve for image formation is longer than the image forming distance in the periphery of the diffusion layer, so that a shift in the focus of an image forming surface occurs. However, the transparent layer forms the shape of the concavely curved surface with respect to the light valve for image formation, so that the shift in the focus can be solved by refraction.

The transparent layer may be so formed as to constitute a Fresnel lens. Consequently, it is possible to increase the directionality of light.

The shape of the concavely curved surface may be one curved in a circular arc shape in at least the horizontal direction. In a case where the shape of the concavely curved surface is one curved in a circular arc shape in the horizontal direction, even if rear projection display devices are laterally connected to achieve a large screen, adjacent screens in the respective rear projection display devices can constitute a continuous circular arc-shaped concavely curved surface. Therefore, an unnatural step can be prevented from being formed in an image stretching over the adjacent screens. It goes without saying that even if the rear projection display devices are connected even longitudinally to further achieve a larger screen, adjacent upper and lower screens in the respective rear projection display devices constitute a continuous surface. Therefore, an unnatural step can be prevented from being formed in an image stretching over the adjacent upper and lower screens. Further, even when the shape of the concavely curved surface is one also curved in a circular arc shape in the vertical direction, that is, forming a spherical surface, a large screen can be similarly achieved.

Furthermore, in the present invention, the rear projection display device can be so constructed that projected images are respectively formed on a screen by two light valves for image formation, and can be used for a three-dimensional (3D) image display device by being so constructed that a left eye image light is emitted from one of the light valves for image formation and a right eye image light is emitted from the other light valve for image formation.

According to the above-mentioned construction, the diffusing screen is formed in the shape of the concavely curved surface with respect to the observer, whereby the observer has a feeling of being surrounded by an image forming the shape of a concavely curved surface. Therefore, the observer feels as if he or she was present more intensely, and can view a more realistic three-dimensional image.

Furthermore, view indexes may be provided within or in the vicinity of a field of view of the observer in a case where the observer views a three-dimensional image.

By providing the view indexes as described above, the observer can stabilize the focus of the eyes on not only the diffusing screen but also the view indexes positioned ahead of the diffusing screen, so that the convergence and the focus of the eyes easily coincide with each other. Therefore, the observer easily feels a three-dimensional effect of a three-dimensional image.

The light valve for image formation may comprise distortion correcting means for correcting an image signal fed to the light valve for image formation in order to correct the distortion at a corner of an image displayed on the screen. When an image forming distance is set between a light emitting portion of the light valve for image formation and the center of the diffusion layer forming the shape of the concavely curved surface, the distance from the light valve for image formation is longer than the image forming distance in the periphery of the diffusion layer. Therefore, the image is enlarged in the periphery, so that the image is distorted. However, the production of such distortion of the image can be reduced by providing the correcting means.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be concretely described on the basis of drawings.

Figure 1:
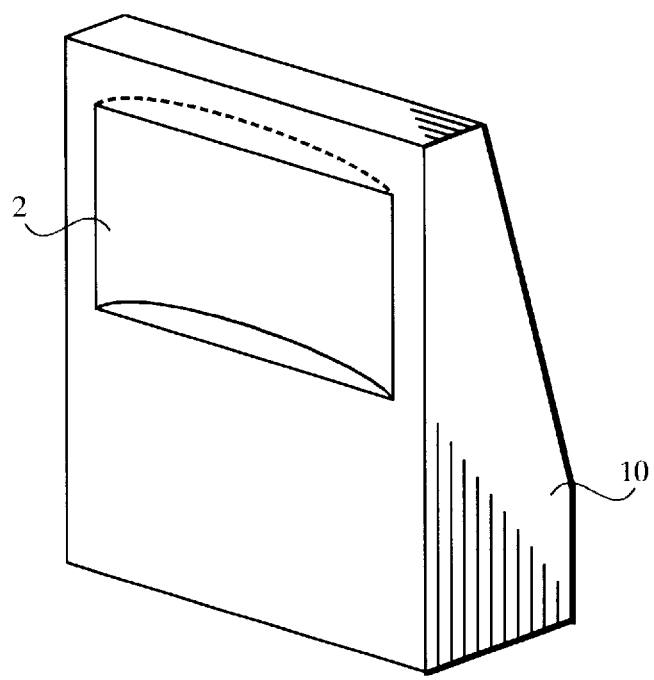
FIG. 1 is a perspective view showing the appearance of a rear projection display device to which the present invention is applied.
Figure 2:
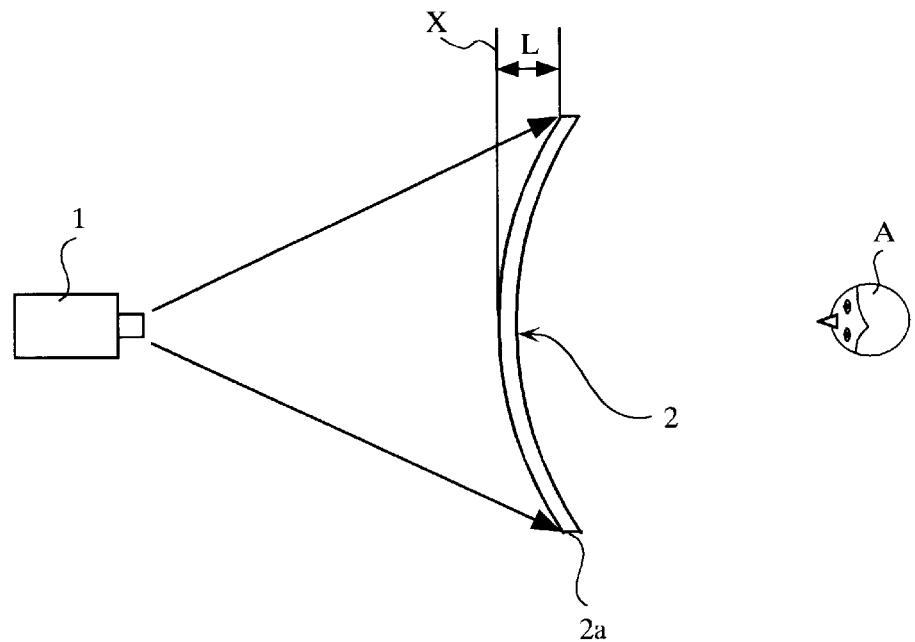
FIG. 2 is a plan view simply showing a rear projection display device according to a first embodiment of the present invention.

FIG. 1 is a perspective view showing the appearance of a rear projection display device to which the present invention is applied, and FIG. 2 is a plan view simply showing a rear projection display device according to a first embodiment of the present invention.

The rear projection display device is so constructed that a light valve for image formation 1 as described later is arranged in its main body 10, and comprises a diffusing screen 2 on which an image projected from the light valve for image formation 1 is formed.

In the rear projection display device shown in FIG. 2, only the light valve for image formation 1 and the diffusing screen 2 placed at a distance of approximately 60 to 70 cm from the light valve for image formation 1 are illustrated, and a mirror or the like constituting a projection optical path from the light valve for image formation 1 to the diffusing screen 2 is omitted. The light valve for image formation 1 comprises a projected image producing optical system composed of a single light valve or three light valves corresponding to R, G and B, and a light source (all of which are not illustrated), and an image processing circuit 3 (as described later using FIG. 4).

The diffusing screen 2 in the rear projection display device according to the present invention comprises a diffusion layer 2a formed in the shape of a concavely curved surface with respect to an observer A. The diffusion layer 2a can be formed by embossing a transparent plate formed in the shape of a concavely curved surface with irregularities, affixing a diffusion sheet (a sheet having irregularities for matting, a semi-cylindrical unit lens portion, and the like formed thereon) to the concavely curved surface of the transparent plate, or including fine diffused particles in the diffusion layer.

The concavely curved surface in the diffusion layer 2a shall be one curved in a circular arc shape only in the horizontal direction in the present embodiment. That is, it shall be in a shape obtained by cutting a part of a cylinder in a square shape. When the diffusing screen 2 is constructed for a 45-inch screen, for example, the curvature of the concavely curved surface in the diffusion layer 2a is so set that the distance L between a virtual plane X in contact with the center of the diffusion layer 2a and a peripheral edge in the lateral direction of the diffusion layer 2a is approximately 30 mm.

As described in the foregoing, the diffusion layer 2a of the diffusing screen 2 is formed in the shape of the concavely curved surface with respect to the observer, whereby the observer has a feeling of being surrounded by an image forming the shape of a concavely curved surface. Therefore, the observer feels as if he or she was present more intensely.

Since the diffusion layer 2a has the shape of the concavely curved surface, there occurs a shift in the focus of an image forming surface at its peripheral edge. When the diffusing screen 2 is placed at a distance of approximately 60 to 70 cm from the light valve for image formation 1, however, a shift in the focus of the entire image formed on the diffusing screen 2, for example, due to the shift in the focus of the image forming surface at the peripheral edge of the diffusion layer 2a is within an allowable range of a normal observer in many cases.

Although the shift in the focus of the image forming surface at the peripheral edge can be allowed to some extent, it is true that the shift in the focus occurs. A second embodiment of the present invention in which the shift in the focus of the image forming surface at the peripheral edge is solved will be described in accordance with FIG. 3.

Figure 3:
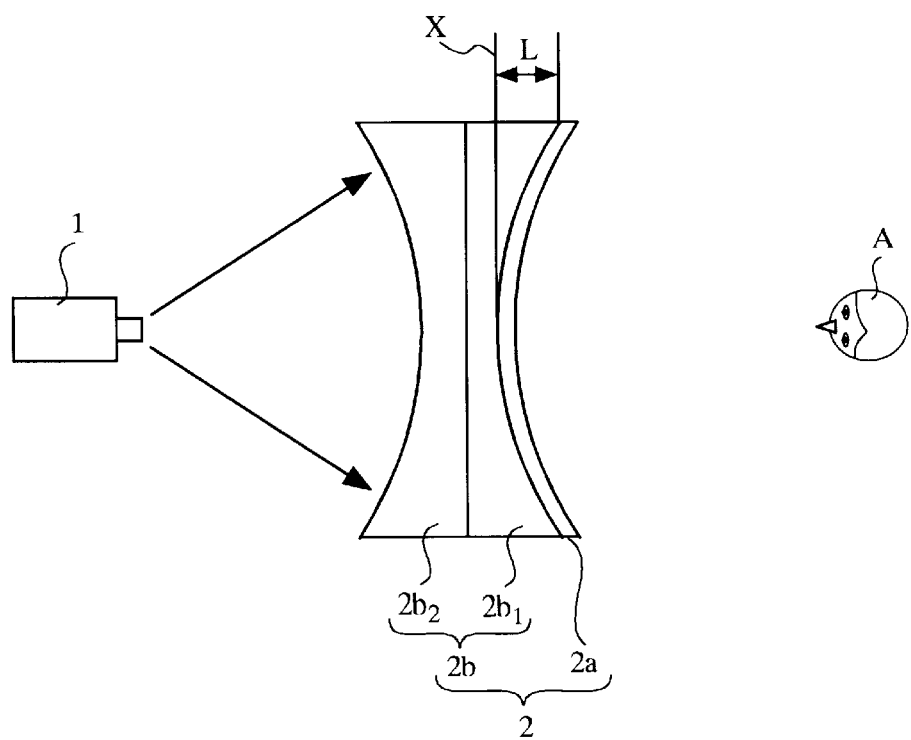
FIG. 3 is a plan view simply showing a rear projection display device in a second embodiment of the present invention.

FIG. 3 is a plan view simply showing a rear projection display device according to the second embodiment of the present invention. A diffusing screen 2 comprises a diffusion layer 2a positioned on the side of an observer A and said transparent layer 2b positioned on the side of a light valve for image formation 1. Further, the transparent layer 2b comprises a first transparent layer portion 2b1 positioned on the side of the observer A and formed in the shape of a concavely curved surface with respect to the observer A and a second transparent layer portion 2b2 positioned on the side of the light valve for image formation 1 and formed in the shape of a concavely curved surface with respect to the light valve for image formation 1, and is constructed by affixing the portions to each other with transparent adhesives. The diffusion layer 2a is formed on the concavely curved surface of the first transparent layer portion 2b1, so that the diffusion layer 2a is formed in the shape of a concavely curved surface with respect to the observer A. The diffusion layer 2a can be formed by embossing the concavely curved surface of the first transparent layer portion 2b1 with irregularities, affixing a diffusion sheet (a sheet having irregularities for matting, a semi-cylindrical unit lens portion, and the like formed thereon) to the concavely curved surface of the first transparent layer portion 2b1, or including fine diffused particles in the diffusion layer, as in the above-mentioned first embodiment.

The concavely curved surface of the first transparent layer portion 2b1, that is, the concavely curved surface in the diffusion layer 2a shall be one curved in a circular arc shape only in the horizontal direction, as in the above-mentioned embodiment. When the diffusing screen 2 is constructed for a 45-inch screen, for example, the curvature of the concavely curved surface in the diffusion layer 2a is so set that the distance L between a virtual plane X in contact with the center of the diffusion layer 2a and a peripheral edge in the lateral direction of the diffusion layer 2a is approximately 30 mm.

The concavely curved surface of the second transparent layer portion 2b2 is so set as to solve a shift of an image forming surface at the peripheral edge in the lateral direction of the diffusion layer 2a which occurs because the diffusion layer 2a has the shape of the concavely curved surface. That is, when an image forming surface in a projected image from the light valve for image formation 1 is so set as to correspond to the virtual plane X in contact with the center of the diffusion layer 2a, the image forming surface is shifted at the peripheral edge in the lateral direction. Therefore, the image forming surface at the peripheral edge in the lateral direction moves farther apart from the light valve for image formation 1 in correspondence to the concavely curved surface in the diffusion layer 2a by refraction caused by the concavely curved surface of the second transparent layer portion 2b2. The concavely curved surface of the second transparent layer portion 2b2 may be so formed as to constitute a Fresnel lens. In this case, it is possible to increase the directionality of light.

In the above-mentioned construction, the projected image from the light valve for image formation 1 leads to the second transparent layer portion 2b2 in the diffusing screen 2, and is subjected to refraction caused by the concavely curved surface of the second transparent layer portion 2b2, so that an image forming distance is increased in the periphery in the lateral direction of the diffusing screen 2, and the image forming distance is along the concavely curved surface in the diffusion layer 2a. Therefore, the image is formed on the diffusion layer 2a without being shifted in the focus.

Figure 4:
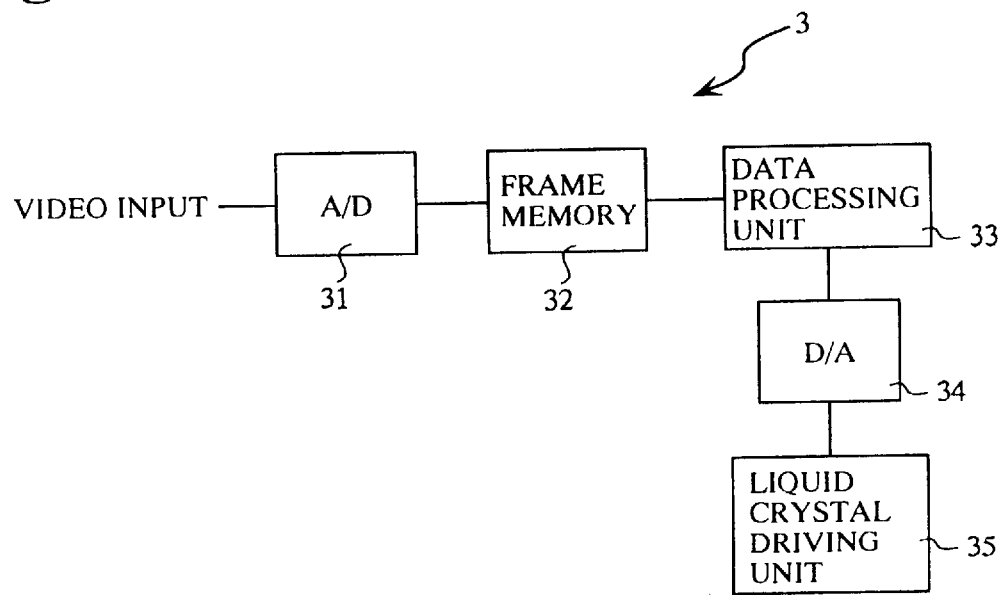
FIG. 4 is a circuit diagram showing an image processing circuit in the embodiment of the present invention.

FIG. 4 is a circuit diagram showing the image processing circuit 3 of the light valve for image formation 1 in the rear projection display device in the first and second embodiments. The image processing circuit 3 comprises an analog-to-digital (A/D) converter 31, to which an analog video signal is inputted, for converting the analog video signal into digital video data, a frame memory 32 storing the digital video data corresponding to one frame, a data processing unit 33 for subjecting the digital video data to various types of processing, a digital-to-analog (D/A) converter 34, to which the digital video data passing through the data processing unit 33 is inputted, for converting the digital video data into an analog video signal, and a liquid crystal driving unit 35 for driving a liquid crystal display panel serving as a light valve on the basis of the analog video signal.

The data processing unit 33 subjects the digital video data to distortion correction processing in addition to aspect conversion processing and zooming processing. The distortion correction processing will be described in detail.

Figure 5:
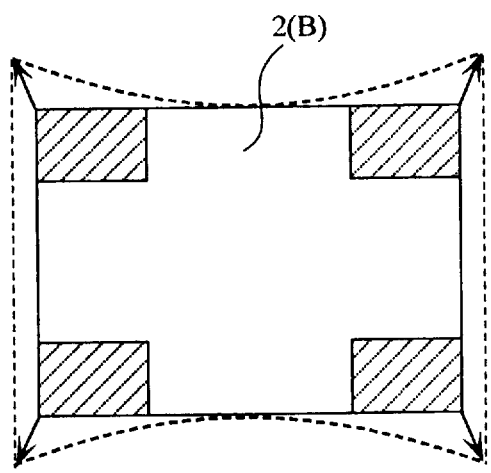
FIG. 5 is an explanatory view showing a projected image having distortion which is projected on a diffusing screen in the embodiment of the present invention from the front of the screen and showing a liquid crystal display panel and its image correcting regions in correspondence to the image.

FIG. 5 is an explanatory view showing a projected image having distortion which is projected on the diffusing screen 2 from the front of the screen and showing a liquid crystal display panel B and its image data correcting regions in correspondence to the image. A square region indicated by a solid line represents the diffusing screen 2 and the liquid crystal display panel B corresponding thereto, and hatched regions at four corners represent the image data correcting regions. A region indicated by a dotted line represents a projected image. The size of the projected image is made larger than that of the diffusing screen 2 as a whole (by approximately 5%). The projected image is distorted at the four corners. The distortion is caused by the fact that when an image forming distance is set between a light emitting portion of the light valve for image formation 1 and the center of the diffusion layer 2a, the distance from the light valve for image formation 1 is longer than the image forming distance at the peripheral edge in the lateral direction of the diffusion layer 2a, so that the image is enlarged, that is, is shifted in directions indicated by arrows at the four corners in the liquid crystal display panel B (shifted by approximately 12 dots, as compared with that in a case where the image is not distorted) at the peripheral edge. That is, the amount of distortion of the image is determined by a projection distance and an amount of screen curvature which is a difference in the projection distance between the center and the periphery of the diffusing screen 2. Further, the setting of the number of pixels to be thinned in a circuit manner in order to correct the amount of distortion is caused by the number of vertical pixels composing the displayed image.

For example, considering a case where the projection distance is 600 mm, and the amount of curvature between the center and the periphery of the diffusing screen 2 is 30 mm, the difference in the projection distance between the center and the periphery of the diffusing screen 2 is 630/600=1.05, whereby the image is enlarged by 5% in the periphery.

Assuming that the number of pixels displayed is VGA Class (640 horizontal pixels×480 vertical pixels), an amount of distortion of 5% corresponds to 480 (pixels)×0.05=24 (pixels), so that 12 pixels are shifted in each of upper and lower positions on the screen.

Figure 6A:
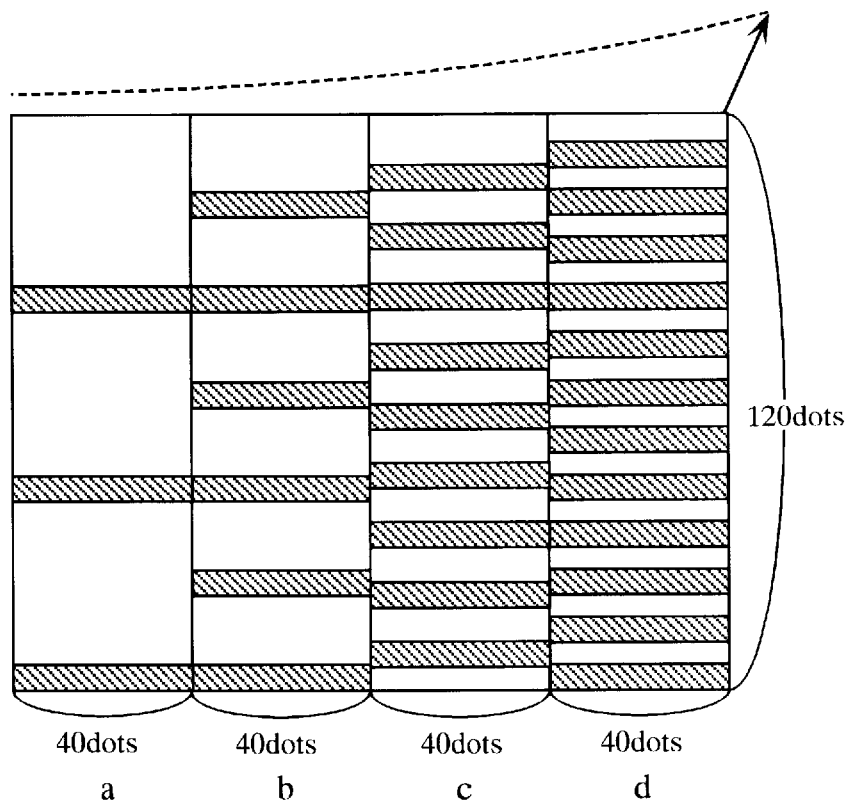
FIG. 6A is an explanatory view showing the image data correcting region at the upper right out of the four image data correcting regions shown in FIG. 5 in an enlarged manner and showing pixel thinning regions by hatching.
Figure 6B:
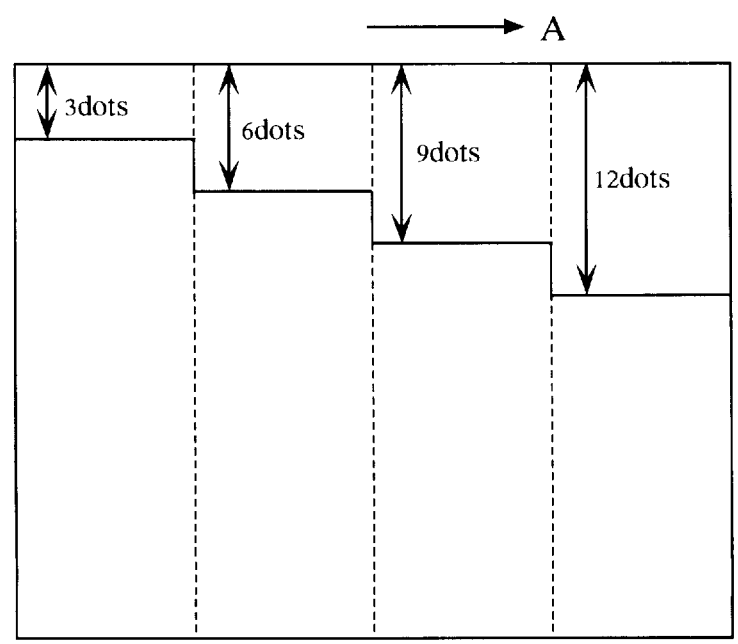
FIG. 6B is an explanatory view showing an image reduced in the image data correcting region.

FIG. 6A is an explanatory view showing the image data correcting region at the upper right out of the four image data correcting regions shown in FIG. 5 in an enlarged manner, and showing pixel thinning regions by hatching. The image data correcting region has dimensions of 120 dots in length by 160 dots in width, and the pixels are gradually thinned in correspondence to a dotted line in the drawing (distortion of the image) in this region. In the present embodiment, the image data correcting region is divided into regions a, b, c and d by dividing 160 dots in width into quarters. In the region d, the pixels corresponding to a total of 12 lines comprising the 10-th, 20-th, 30-th, . . . , 120-th lines are thinned. In the region c, the pixels corresponding to a total of 9 lines comprising the 14-th, 27-th, 40-th, . . . , 118-th lines are thinned. In the region b, the pixels corresponding to a total of 6 lines comprising the 20-th, 40-th, 60-th, 80-th, 100-th, and 120-th lines are thinned. In the region a, the pixels corresponding to a total of three lines comprising the 40-th, 80-th, and 120-th lines are thinned. By such correction processing, as shown in FIG. 6B, the amount of correction of the image data is gradually increased in a direction indicated by an arrow A in the drawing, so that the image data is reduced in correspondence to the distortion. The same correction processing is performed even in the other image data correcting region.

Although in the above-mentioned example, the region having dimensions of 120 dots by 160 dots is illustrated as the image data correcting region, the present invention is not limited to the same. Further, even in a method of thinning pixels, the present invention is not limited to the above-mentioned example.

Furthermore, the image data reduced as described above in the image data correcting region is fed by the distortion correcting processing in the data processing unit 33 on the liquid crystal display panel B in the light valve for image formation 1, whereby the distortion of the image formed on the diffusion layer 2a is reduced, in cooperation with enlargement of the image made by projection at four corners of the image.

By seeing the image displayed on the diffusion layer 2a forming the shape of a concavely curved surface in the diffusing screen 2, the observer A has a feeling of being surrounded by the image. Therefore, the observer feels as if he or she was present more intensely.

Figure 7:
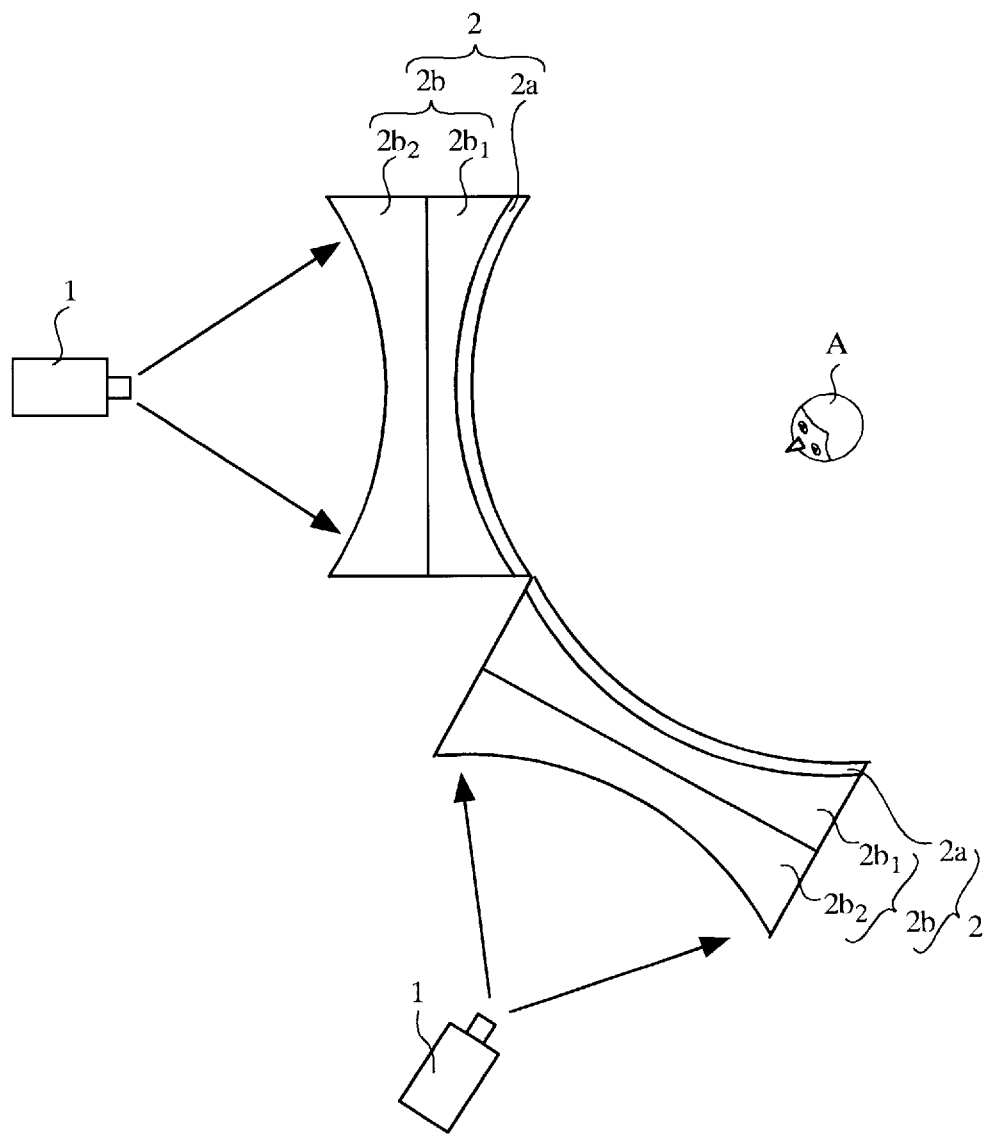
FIG. 7 is a plan view simply showing an aggregate type rear projection display device constructed by laterally arranging two rear projection display devices according to the embodiment of the present invention.

FIG. 7 is an explanatory view showing an aggregate type rear projection display device constructed by laterally connecting rear projection display devices of the above-mentioned construction to achieve a large screen. Diffusion layers 2a of adjacent diffusing screens 2 in the respective rear projection display devices constitute a continuous circular arc-shaped concavely curved surface. Therefore, an unnatural step can be prevented from being formed in an image stretching over the adjacent diffusing screens 2. It goes without saying that even if rear projection display devices are connected even longitudinally to further achieve a larger screen, adjacent upper and lower diffusing screens in the respective rear projection display devices constitute a continuous surface. Therefore, an unnatural step can be prevented from being formed in an image stretching over the adjacent upper and lower diffusing screens.

The rear projection display device according to the present invention can be also used for displaying a three-dimensional image in addition to displaying a two-dimensional image. When a three-dimensional image is viewed without using any glasses by displaying the three-dimensional image, it is possible to use a structure comprising a lenticulated plate and a parallax barrier, for example, between the diffusing screen 2 and the observer A. Further, in the image processing circuit 3, a right eye image and a left eye image are alternately produced in a time-divisional manner, and are projected on the screen 2. Therefore, the observer A can view a three-dimensional image by using liquid crystal shutter glasses.

An embodiment applied to an apparatus for forming a left eye image and a right eye image on the diffusing screen 2 in the rear projection display device according to the present invention, and separating the left and right images by wearing polarizing glasses, to view a three-dimensional image will be described with reference to FIGS. 8 to 10.

Figure 8:
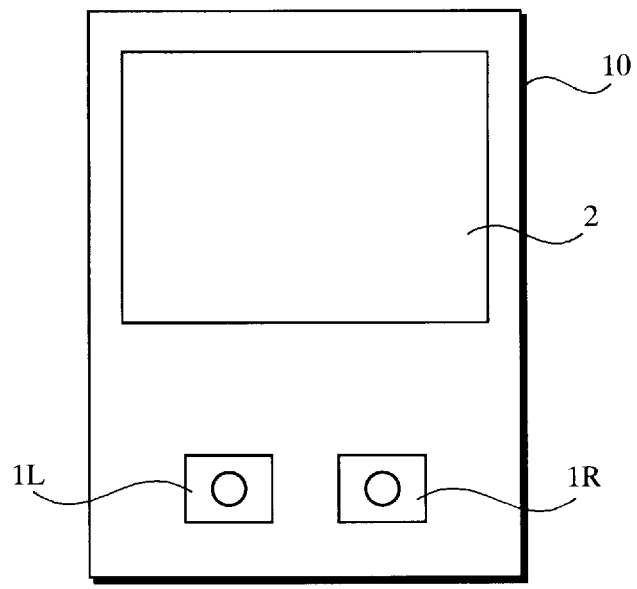
FIG. 8 is a front view showing the appearance of the rear projection display device according to the present invention which is used for a 3D image display device.
Figure 9:
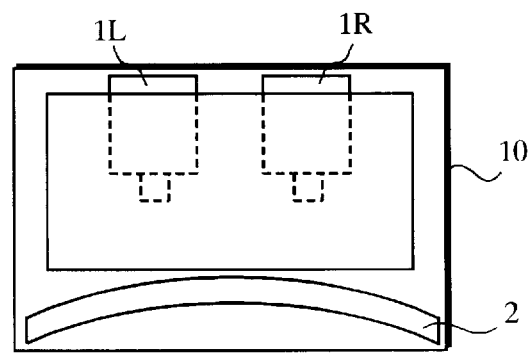
FIG. 9 is a top view of FIG. 8.
Figure 10:
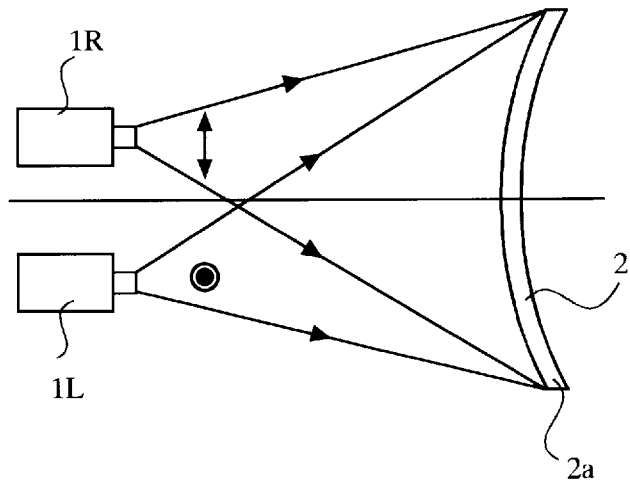
FIG. 10 is a plan view simply showing a rear projection display device according to a third embodiment of the present invention.

FIG. 8 is a front view showing the appearance of the rear projection display device according to the present invention which is used for a 3D image display device, FIG. 9 is a top view of FIG. 8, and FIG. 10 is a plan view simply showing a rear projection display device according to a third embodiment of the present invention.

The rear projection display device comprises in its main body 10 a light valve for image formation 1L dedicated to a left eye image and a light valve for image formation 1R dedicated to a right eye image, and a diffusing screen 2 for forming images from both the light valves for image formation 1L and 1R.

In the rear projection display device shown in FIG. 10, only the light valves for image formation 1L and 1R, and the diffusing screen 2 placed at a distance of approximately 60 to 70 cm from the light valves for image formation 1L and 1R are illustrated, and a mirror or the like constituting a projection optical path from the light valves for image formation 1L and 1R to the diffusing screen 2 is omitted. Each of the light valves for image formation 1L and 1R comprises a projected image producing optical system composed of a single light valve or three light valves corresponding to R, G and B, and a light source (all of which are not shown), and an image processing circuit 3 of the above-mentioned construction shown in FIG. 4.

Image light beams which differ in the direction of polarization are respectively emitted from both the light valves for image formation 1L and 1R. For example, in the present embodiment, an image light beam vertically (S) polarized and an image light beam horizontally (P) polarized are respectively emitted from the left eye light valve for image formation 1L and the right eye light valve for image formation 1R, for example. The image light beams emitted from both the light valves for image formation 1L and 1R respectively cause left and right images to be formed upon being overlapped with each other on the diffusing screen 2.

The diffusing screen 2 comprises a diffusion layer 2a formed in the shape of a concavely curved surface with respect to an observer A, as in the above-mentioned first embodiment.

The concavely curved surface in the diffusion layer 2a shall be one curved in a circular arc shape only in the horizontal direction, as in the above-mentioned embodiment. When the diffusing screen 2 is constructed for a 45-inch screen, for example, the curvature of the concavely curved surface in the diffusion layer 2a is so set that the distance L between a virtual plane X in contact with the center of the diffusion layer 2a and a peripheral edge in the lateral direction of the diffusion layer 2a is approximately 30 mm.

Images from both the light valves for image formation 1L and 1R are formed upon being overlapped with each other on the diffusion layer 2a of the diffusing screen 2. The observer wears polarizing glasses comprising a polarizing plate absorbing polarized light for a right eye image and transmitting polarized light for a left eye image and a polarizing plate absorbing polarized light for a left eye image and transmitting polarized light for a right eye image, respectively, for the left eye and the right eye, so that images respectively corresponding to the left and right eyes are viewed, to view a three-dimensional image.

As described in the foregoing, the diffusion layer 2a of the diffusing screen 2 is formed in the shape of the concavely curved surface with respect to the observer, whereby the observer has a feeling of being surrounded by an image forming the shape of a concavely curved surface. Therefore, the observer feels as if he or she was present more intensely, and can view a more realistic three-dimensional image.

As in the above-mentioned first embodiment, the diffusion layer 2a in the third embodiment has the shape of the concavely curved surface. Consequently, there occurs a shift in the focus of an image forming surface at its peripheral edge. When the diffusing screen 2 is placed at a distance of approximately 60 to 70 cm from the light valves for image formation 1L and 1R, however, a shift in the focus of the entire image formed on the diffusing screen 2, for example, due to the shift in the focus of the image forming surface at the peripheral edge of the diffusion layer 2a is within an allowable range for a normal observer in many cases.

Although the shift in the focus of the image forming surface at the peripheral edge can be allowed to some extent, it is true that the shift in the focus occurs. An embodiment in which the shift in the focus of the image forming surface at the peripheral edge is solved is shown in FIG. 11.

Figure 11:
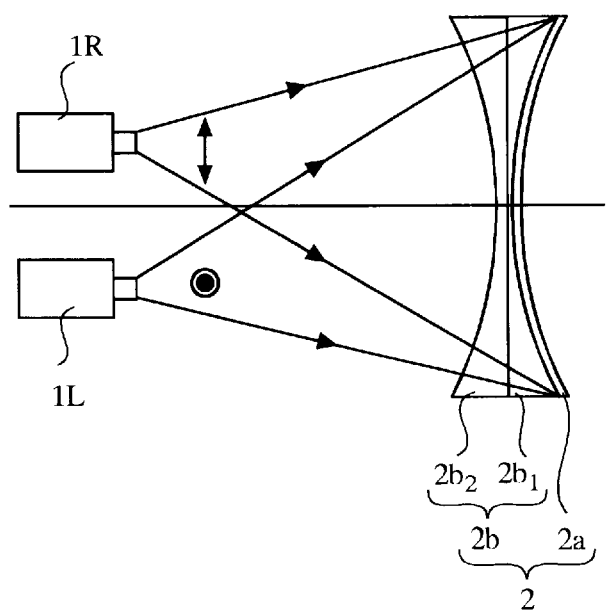
FIG. 11 is a plan view simply showing a rear projection display device according to a fourth embodiment of the present invention.

FIG. 11 is a plan view simply showing a rear projection display device according to a fourth embodiment of the present invention. A diffusing screen 2 comprises a diffusion layer 2a positioned on the side of an observer A and a transparent layer 2b positioned on the side of light valves for image formation 1L and 1R, as in the second embodiment. Further, the transparent layer 2b comprises a first transparent layer portion 2b1 positioned on the side of the observer A and formed in the shape of a concavely curved surface with respect to the observer A and a second transparent layer portion 2b2 positioned on the side of the light valves for image formation 1L and 1R and formed in the shape of a concavely curved surface with respect to the light valves for image formation 1L and 1R, and is constructed by affixing the portions to each other with transparent adhesives. The diffusion layer 2a is formed on the concavely curved surface of the first transparent layer portion 2b1, so that the diffusion layer 2a is formed in the shape of a concavely curved surface with respect to the observer A. The diffusion layer 2a can be formed by embossing the concavely curved surface of the first transparent layer portion 2b1 with irregularities, affixing a diffusion sheet (a sheet having irregularities for matting, a semi-cylindrical unit lens portion, and the like formed thereon) to the concavely curved surface of the first transparent layer portion 2b1, or including fine diffused particles in the diffusion layer, as in the above-mentioned second embodiment.

The concavely curved surface of the first transparent layer portion 2b1, that is, the concavely curved surface in the diffusion layer 2a shall be one curved in a circular arc shape only in the horizontal direction in the present embodiment. That is, it shall be in a shape obtained by cutting a part of a cylinder in a square shape. When the diffusing screen 2 is constructed for a 45-inch screen, for example, the curvature of the concavely curved surface in the diffusion layer 2a is so set that the distance L between a virtual plane X in contact with the center of the diffusion layer 2a and a peripheral edge in the lateral direction of the diffusion layer 2a is approximately 30 mm.

The concavely curved surface of the second transparent layer portion 2b2 is so set as to solve a shift of an image forming surface at the peripheral edge in the lateral direction of the diffusion layer 2a which occurs because the diffusion layer 2a has the shape of the concavely curved surface. That is, when an image forming surface in projected images from the light valves for image formation 1L and 1R is so set as to correspond to the virtual plane X in contact with the center of the diffusion layer 2a, the image forming surface is shifted at the peripheral edge in the lateral direction. Therefore, the image forming surface at the peripheral edge in the lateral direction moves farther apart from the light valves for image formation 1R and 1L in correspondence to the concavely curved surface in the diffusion layer 2a by refraction caused by the concavely curved surface of the second transparent layer portion 2b2. The concavely curved surface of the second transparent layer 2b2 may be so formed as to constitute a Fresnel lens. In this case, it is possible to increase the directionality of light.

In the above-mentioned construction, the projected images from the light valves for image formation 1L and 1R lead to the second transparent layer portion 2b2 in the diffusing screen 2, and are subjected to refraction caused by the concavely curved surface of the second transparent layer portion 2b2, so that an image forming distance is increased in the periphery in the lateral direction of the diffusing screen 2, and the image forming distance is along the concavely curved surface in the diffusion layer 2a. Therefore, the images are formed on the diffusion layer 2a without being shifted in the focus.

Also in the above-mentioned third and fourth embodiments, the rear projection display device may be so constructed as to perform distortion correcting processing in the above-mentioned image processing circuit 3. Image data reduced as described above in the image data correcting region is fed on liquid crystal display panels B in the light valves for image formation 1L and 1R by the distortion correcting processing in the data processing unit 33 in the above-mentioned image processing circuit 3, whereby the distortion of the image formed on the diffusion layer 2a is reduced, in cooperation with enlargement of the image made by projection at four corners of the image.

Although in the above-mentioned third and fourth embodiments, two light valves for image formation are used for a three-dimensional image, the present invention can be also used for an apparatus for performing highly precise projection using two light valves for image formation.

In a case where a three-dimensional image is displayed using the rear projection display device in the above-mentioned embodiment, in an image recognized by an observer as if it projected from the diffusing screen 2, the convergence of the eyes of the observer is directed toward the projecting image. However, the focus of the eyes tends to coincide with not the projecting image but a display screen. Therefore, the observer does not easily recognize a three-dimensional effect because the focus and the convergence of the eyes do not coincide with each other.

Figure 12:
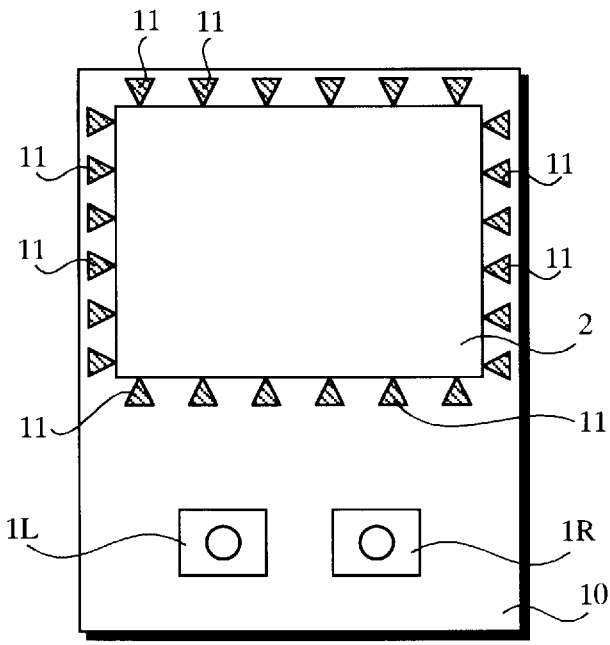
FIG. 12 is a front view showing a rear projection display device according to a fifth embodiment of the present invention.

In an embodiment shown in FIG. 12, view indexes 11 are provided within a field of view of the observer in the vicinity of the diffusing screen 2. In the present embodiment, the view indexes 11 are so provided as to surround the diffusing screen 2. By providing the view indexes 11, the observer can stabilize the focus of the eyes on not only the diffusing screen 2 but also the view indexes positioned ahead of the diffusing screen 2, so that the convergence and the focus easily coincide with each other. Therefore, the observer easily feels a three-dimensional effect of a three-dimensional image.

Part of the view indexes 11 may be positioned within the field of view of the observer. Further, the shape of the view index 11 may be such a shape that the area occupied by the view index 11 is partially changed. If the view index 11 is in such a shape, the view index 11 is easily recognized by the observer.

Figure 13:
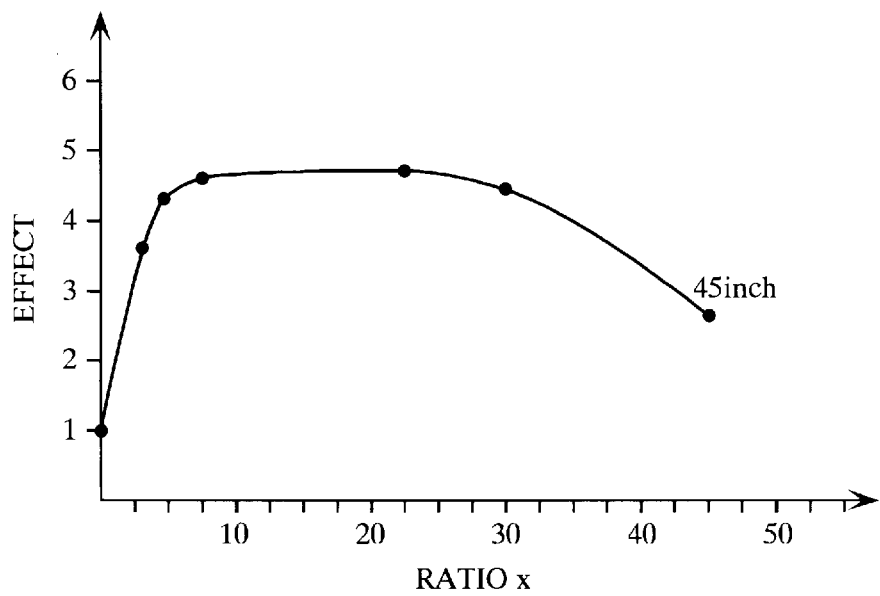
FIG. 13 is a diagram showing how a three-dimensional effect is emphasized in a case where the ratio x of view indexes 11 is changed in the rear projection display device shown in FIG. 12.
Figure 14:
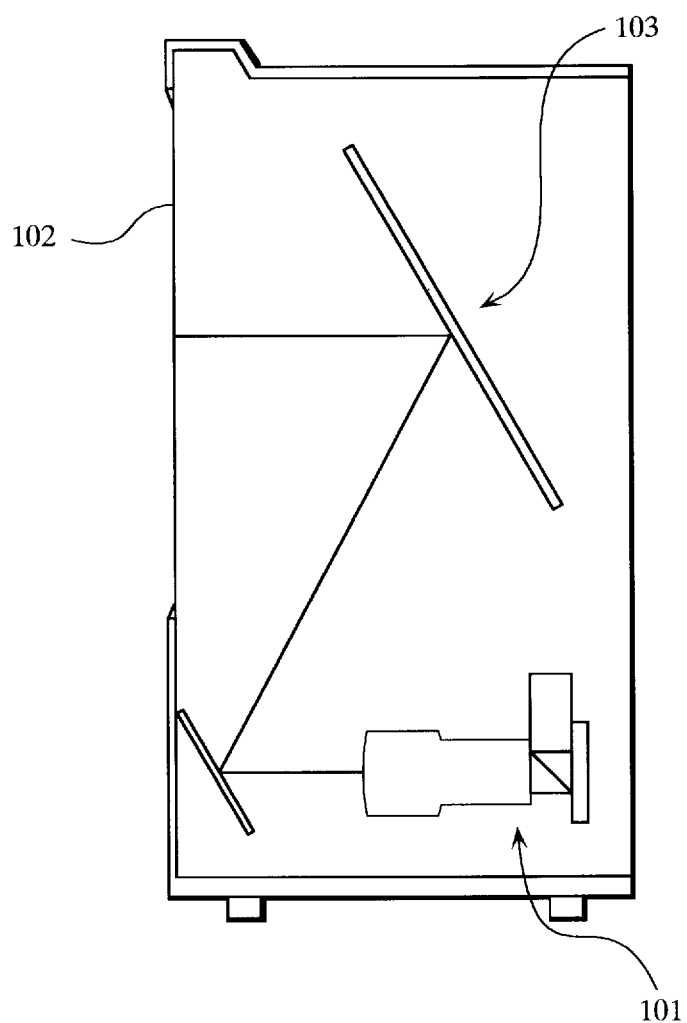
FIG. 14 is a diagram showing the schematic construction of a conventional rear projection display device.

FIG. 13 is a diagram showing how a three-dimensional effect is emphasized in a case where the ratio of the view indexes 11 is changed in the rear projection display device shown in FIG. 12. The size of the diffusing screen 2 in this case is measured by a 45-inch screen. Herein, the ratio x of view indexes=the distance y between view indexes/the horizontal size of the screen. The effect represented by the vertical axis is an average value in a case where a three-dimensional effect in each of the ratios x is evaluated in six stages, letting a three-dimensional effect in a case where there is no view index be one, and a three-dimensional effect which is most emphasized be six when a plurality of persons are caused to view a three-dimensional image by changing the ratio.

As can be seen from FIG. 13, the three-dimensional effect is most emphasized when the ratio x is in the range of 5 to 30%.

Although in each of the above-mentioned embodiments, the diffusion layer 2a is one curved in a circular arc shape only in the horizontal direction, the present invention is not limited to the same. For example, the diffusion layer 2a may be also one curved in a circular arc shape in the vertical direction, that is, in a shape obtained by cutting a part of a spherical surface in a square shape. Also in this case, a large screen can be similarly achieved.

As described in the foregoing, according to the rear projection display device in the present invention, such an effect that the observer can feel as if he or she was present more intensely is produced. Further, if the rear surface of the diffusing screen forms the shape of the concavely curved surface, it is possible to prevent a shift of an image forming surface at four corners of a projected image. Further, if the rear projection display device comprises distortion correcting means, it is possible to prevent enlarged distortion at four corners of a projected image. If the shape of the concavely curved surface of the diffusion layer is curved in a circular arc shape in at least the horizontal direction, it is possible to prevent, even when such a plurality of rear projection display devices are arranged to display an image, an unnatural step from being formed in an image stretching over the adjacent diffusing screens in the rear projection display devices.

If the rear projection display device is used for a 3D image display device, the diffusing screen is formed in the shape of a concavely curved surface with respect to the observer, so that the observer has a feeling of being surrounded by an image forming the shape of a concavely curved surface. Therefore, the observer feels as if he or she was present more intensely, and can view a more realistic three-dimensional image.

Furthermore, the observer can stabilize the focus of the eyes on not only the diffusing screen but also the view indexes positioned ahead of the diffusing screen by providing the view indexes within or in the vicinity of the field of view of the observer in a case where the observer views a three-dimensional image. Therefore, the convergence and the focus of the eyes easily coincide with each other. Therefore, the observer easily feels a three-dimensional effect of a three-dimensional image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rear projection display device so adapted as to receive a projected image from a light valve for image formation on the rear surface of a screen and emit image light toward an observer positioned on the front side of the screen, wherein
    said screen is formed in the shape of a concavely curved surface with respect to the observer, and wherein
    said screen comprises a diffusion layer positioned on the side of said observer and forming said shape of the concavely curved surface with respect to the observer, and a transparent layer positioned on the side of said light valve for image formation and forming the shape of a concavely curved surface with respect to the light valve for image formation.

2. The rear projection display device according to claim 1, wherein
    said shape of the concavely curved surface is curved in a circular arc shape in at least the horizontal direction.

3. The rear projection display device according to claim 1, wherein
    view indexes are further provided within or in the vicinity of a field of view of the observer in a case where the observer views a three-dimensional image.

4. The rear projection display device according to claim 1, wherein
    said transparent layer is so formed as to constitute a Fresnel lens.

5. The rear projection display device according to claim 1, wherein
    said light valve for image formation comprises distortion correcting means for correcting an image signal fed to the light valve for image formation in order to correct the distortion at a corner of an image displayed on said screen.

6. A rear projection display device so adapted as to respectively receive projected images from two light valves for image formation on the rear surface of a screen and emit image light toward an observer positioned on the front side of the screen, wherein
    said screen is formed in the shape of a concavely curved surface with respect to the observer, and wherein
    said screen comprises a diffusion layer positioned on the side of said observer and forming said shape of the concavely curved surface with respect to the observer, and a transparent layer positioned on the side of said light valve for image formation and forming the shape of a concavely curved surface with respect to said light valve for image formation.

7. The rear projection display device according to claim 6, wherein
    said shape of the concavely curved surface is curved in a circular arc shape in at least the horizontal direction.

8. The rear projection display device according to claim 6, wherein
    left eye image light and right eye image light are respectively emitted from one of the light valves for image formation and the other light valve for image formation.

9. The rear projection display device according to claim 6, wherein
    view indexes are further provided within or in the vicinity of a field of view of the observer in a case where the observer views a three-dimensional image.

10. The rear projection display device according to claim 6, wherein
    said transparent layer is so formed as to constitute a Fresnel lens.

11. The rear projection display device according to claim 6, wherein each of said light valves for image formation comprises distortion correcting means for correcting an image signal fed to the light valve for image formation in order to correct the distortion at a corner of an image displayed on said screen.

12. A rear projection display device so adapted as to receive a projected image from a light valve for image formation on the rear surface of a screen and emit image light toward an observer positioned on the front side of the screen, wherein said screen is formed in the shape of a concavely curved surface with respect to the observer, and wherein said light valve for image formation comprises distortion correcting means for correcting an image signal fed to the light valve for image formation in order to correct the distortion at a corner of an image displayed on said screen.

13. The rear projection display device according to claim 12, wherein said shape of the concavely curved surface is curved in a circular arc shape in at least the horizontal direction.

14. The rear projection display device according to claim 12, wherein view indexes are further provided within or in the vicinity of a field of view of the observer in a case where the observer views a three-dimensional image.

15. A rear projection display device so adapted as to respectively receive projected images from two light valves for image formation on the rear surface of a screen and emit image light toward an observer positioned on the front side of the screen, wherein said screen is formed in the shape of a concavely curved surface with respect to the observer, and wherein each of said light valves for image formation comprises distortion correcting means for correcting an image signal fed to the light valve for image formation in order to correct the distortion at a corner of an image displayed on said screen.

16. The rear projection display device according to claim 15, wherein said shape of the concavely curved surface is curved in a circular arc shape in at least the horizontal direction.

17. The rear projection display device according to claim 15, wherein left eye image light and right eye image light are respectively emitted from one of the light valves for image formation and the other light valve for image formation.

18. The rear projection display device according to claim 15, wherein view indexes are further provided within or in the vicinity of a field of view of the observer in a case wherein the observer views a three-dimensional image.

* * * * *